I. LANCASTER.
Improvement in Joints for School-Desks.
No. 129,239.                            Patented July 16, 1872.
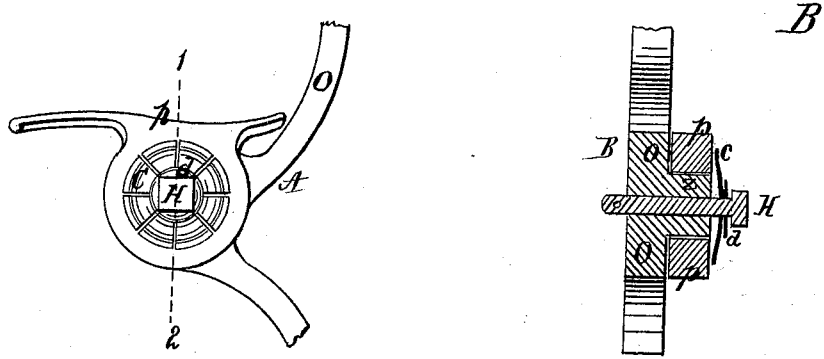
Witnesses.  
Jno. C. Durborow.  
Chalkley Stott.
Inventor.  
Israel Lancaster.

No. 129,239

UNITED STATES PATENT OFFICE.

ISRAEL LANCASTER, OF BALTIMORE, MARYLAND.

IMPROVEMENT IN JOINTS FOR SCHOOL SEATS AND DESKS.

Specification forming part of Letters Patent No. 129,239, dated July 16, 1872.

SPECIFICATION.

I, ISRAEL LANCASTER, of Baltimore, in the State of Maryland, have invented certain Improvements in Joints or Hinges for School Desks and Seats, of which the following is a specification:

My invention relates to securing a friction-hinge for school-seats, and also for school-desks when the latter are hinged, which shall be both easily made and durable, and is intended to apply to any kind of hinged seats or desks used in schools.

At A on the accompanying drawing is shown a side elevation of the hinge and cast-iron end frame in part. At B is shown a vertical section of the hinge through its center, on the dotted line 1 2.

O is the frame, furnished with the circular projection Z, which forms part of the hinge. $p$ is the casting to which the seat or desk boards are fastened, and which is made with a circular eye, which fits over the part Z, making the other part of the hinge. H is a round-shanked rivet with a flat head. C is a dished steel washer, and $d$ is a small brass washer.

Through the center of the lug Z a hole is drilled, fitting the shank of the rivet H. The brass washer is then slipped on the rivet and pushed up to the head; the steel washer is put upon the rivet next, with the convex side next to the brass washer. The rivet is then slipped through the hole in Z and riveted after being pressed firmly through. The washer C now presses against the part $p$ of the hinge which holds the seat, thereby causing friction, which prevents the seat from falling and making a noise from any position in which it may be placed. The washer C revolves on the rivet when the seat is thrown up or down, and the brass washer $d$, between the washer C and the head of the rivet, prevents wearing of parts.

The above description will enable any one skilled in the art to make and use my invention.

I claim—

The dished steel washer C, acting in combination with the parts O and $p$ of the hinge, when constructed and operating substantially as described.

ISRAEL LANCASTER.

Witnesses:
    JNO. C. DURBOROW,
    CHALKLY HOLT.